United States Patent [19]

Schatz et al.

[11] 4,124,870
[45] Nov. 7, 1978

[54] METHOD FOR IMPROVING PRINT QUALITY OF COARSE-SCAN/FINE-PRINT CHARACTER REPRODUCTION

[75] Inventors: Bruce R. Schatz, Cambridge, Mass.; Kwan Y. Wong, San Jose, Calif.

[73] Assignee: International Business Machines Corporation, Armonk, N.Y.

[21] Appl. No.: 783,375

[22] Filed: Mar. 31, 1977

[51] Int. Cl.² .............................................. H04N 7/12
[52] U.S. Cl. .......................... 358/260; 340/146.3 MA
[58] Field of Search ................ 358/133, 260, 261, 283; 340/146.3 H, 146.3 MA

[56] References Cited

U.S. PATENT DOCUMENTS

| | | | |
|---|---|---|---|
| 3,462,547 | 8/1969 | Macovski | 358/133 |
| 3,573,789 | 4/1971 | Sharp et al. | 340/146.3 H |
| 3,977,007 | 8/1976 | Berry et al. | 346/75 |
| 3,980,809 | 9/1976 | Cook | 358/260 |
| 3,984,626 | 10/1976 | Mounts et al. | 358/133 |
| 4,047,152 | 9/1977 | Giuliano et al. | 340/146.3 MA |

Primary Examiner—Robert L. Griffin
Assistant Examiner—Joseph A. Orsino, Jr.
Attorney, Agent, or Firm—James A. Pershon

[57] ABSTRACT

A directional biasing method enhances the print quality of coarsely scanned characters. A coarse scanning device produces analog signals that are compressed by encoding common information in a run length coding and encoding at least an edge of the character information according to a grey level indication. The data information is reproduced wherein the grey scale information is decoded to represent a finer print than the picture element scanned. The biasing and placement of the dots is set according to the grey scale of the surrounding picture elements. Eight sums are obtained of various groups of three peripheral picture elements corresponding to eight patterns located symmetrically on both sides of 4 bisecting lines, vertical, horizontal and two 45° lines. A particular matrix of print dot placement is selected according to the largest pattern sum among the eight possible cases. The dots in each matrix are designed to being strongly biased toward the direction of the associated pattern.

8 Claims, 16 Drawing Figures

| SCAN PEL | LINE F | LINE K |
|---|---|---|
| 1 | 0 | 0 |
| 2 | 0 | 0 |
| 3 | 0 | 1(8) |
| 4 | 0 | 1(16) |
| 5 | 1(12) | 1(8) |
| 6 | 1(16) | 0 |
| 7 | 1(16) | 0 |
| 8 | 1(12) | 1(8) |
| 9 | 1(1) | 1(16) |
| 10 | 0 | 1(10) |
| 11 | 0 | 0 |
| 12 | 0 | 0 |

METHOD FOR IMPROVING PRINT QUALITY OF COARSE-SCAN/FINE-PRINT CHARACTER REPRODUCTION

CROSS REFERENCE TO RELATED APPLICATIONS

The Description of the Preferred Embodiment of this Patent Application contains a description of an invention relating to a Patent Application Ser. No. 783,374 by K. Y. Wong and entitled "Method of a Coarse-Scan/Fine-Print Character Reproduction with Compression."

BACKGROUND OF THE INVENTION

This invention relates generally to a print reproduction system and more specifically to the method of improving the print quality by grey scaling coarse scan information for fine printing and by biasing individual print dots toward the character.

FIELD OF THE INVENTION

In a facsimile communication system, images comprising black characters on a white background are usually transmitted to a reproducing system such as a cathode ray tube or light emitting diodes, or to a dot printer such as an ink jet or wire printer. Generally, the images are coarsely scanned and coarsely printed to permit faster transmission to the display reproduction device. The coarsely scanned information can be encoded into a compressed form before transmission to permit an ease and speed of transmission to the display reproduction device.

To obtain a high quality reproduction of the original image, generally a fine scan device and a fine reproduction device is used. Thus, for high quality reproduction, the characters are generally scanned at, for instance, 720 picture elements (pels) per inch, and reproduced at the same picture element rate. This produces a very good reproduction of the original character. However, this high number of picture elements at the scanning device, forces the storage of many bits of information since the picture element must each be converted to a binary data information for transmission.

Coarse scanning together with a fine print device which is the subject of the above referenced patent application produced an improvement between the coarse scan and coarse print system but no method was available for converting the coarsely scanned information into the high resolution print that was as sharp as a fine scan/fine print system.

It is, therefore, an important object of the present invention to provide a system for the transmission of character data that permits the use of the advantages of coarsely scanned data and fine print resolution by the introduction of a grey scale-coarse scan data information that is converted to a dot reproduction device that biases the printing dots according to the surrounding coarsely scanned picture elements.

DESCRIPTION OF THE PRIOR ART

The scanning, binary encoding, transmission and reproduction of the scan information is well known. It is proposed by the present invention to use a coarse scan together with a fine print reproduction to obtain a high print resolution. The high resolution is obtained by using the information from neighboring scan elements to bias the printing dots in the reproduction system towards the character rather than in a haphazard fashion.

In picture processing, interpolation is widely employed in data compression; for instance, reference is made to an article "Redundancy Reduction—A Practical Method of Data Compression", by C. M. Kortman in the Proceedings of the IEEE 55, March 1967, pages 253–263, and the article "Adaptive Data Compression", by C. A. Andrews in the Proceedings of the IEEE 55, March 1967, pages 267–277. To achieve more efficient coding of black and white graphic data, the author, Dr. P. Stucki, in the article "Efficient Transmission of Graphics Using Polyomino Filtering at the Receiver" in "IEEE Transactions on Aerospace and Electronic Systems" AES-6, November 1970, pages 811–814, discloses that a transmission of every other sample in a raster scan while using a "Polyomino filter" to examine neighboring bit patterns, can be used to reconstruct the original data at the reproduction system.

The article, "Image Coding Via a Nearest Neighbor Image Model" by A. K. Jain, in the IEEE Transactions on Communications COM-23, March 1975, pages 318–331, discloses a model using a nearest neighbor image for coding grey scale pictures. The interpolation schemes used in these articles can be considered as using neighboring scan elements to estimate the value of a scan element. The interpolation scheme employed in the present invention uses the neighboring elements to bias a printing dot inside a scan element during processing and the analog scan value is not affected.

Another object of the present invention, therefore, is to provide an enhanced biasing scheme to provide a precision reproduction of a coarsely scanned element.

U.S. Pat. Nos. 3,483,317 to DeGroat and 3,643,019 to Beltz teach compaction of graphic data by run length encoding with binary numbers corresponding to generation blocks of data while using characterized control digits to switch between black and white data. Neither of these references uses this in combination with grey level representation that is used to obtain a fine-print reproduction together with a biasing method that uses the grey scale information and the neighboring scanned information to precisely position the print dot according to the neighboring associated pattern.

Yet another object of the present invention, therefore, is to provide a method of enhancing coarsely scanned data to accomplish a fine print reproduction.

SUMMARY OF THE INVENTION

In accordance with the present invention, high resolution characters are obtained from lower resolution scanned data by obtaining digital scan values of the analog information of the coarsely scanned character from white to grey level and all black. The grey level information is used to activate the number of reproducing dots for each coarsely scanned picture element. The placement of these dots is accomplished by first obtaining the scan value for the surrounding picture elements. The patterned sums using the scan values for the surrounding elements is then calculated. The largest patterned sum is found and the appropriate number of dots in the print block are placed according to the largest pattern sum found.

The method for printing coarsely scanned data at an improved print quality comprises the steps of providing a device capable of reproducing a plurality of black dot picture elements within each coarsely scanned area, obtaining scan values for each scan element surrounding the scan area, calculating the pattern sum of the scan values, producing a threshold matrix corresponding to each of the pattern sums, selecting the largest pattern sum produced, and reproducing the threshold matrix corresponding to the selected pattern sum whereby the pattern reproduced has its dot print biased toward the character.

According to the present invention a method of reproducing grey level data comprises the steps of coarse scanning picture elements to provide encoded data identifying the white and levels of grey to black picture elements. The grey to black level picture elements are encoded representing the grey level on a scale of N. The coarsely scanned picture elements are decoded to an A × B matrix for each picture element where the product of A and B is equal to N. The decoded coarsely scanned data is reproduced by producing a black dot in the matrix in numbers proportional to the encoded grey level picture element. The reproduction system utilizes information from neighboring picture elements (pels) to bias the printing dots of each pel towards the character or dark side of the input data as represented by the surrounding pels. Since a scanned data normally comprises a square area of the character, the surrounding pels comprise eight pels. The grey level values, from white to black, are obtained for each of these eight surrounding pels. From these grey level values, eight pattern sums are calculated. The largest pattern sum is found. The appropriate number of dots in the scan pel under scrutiny is placed according to the largest pattern sum found. This results in the controlled weighing of the print dots most heavily toward the surrounding pels containing character information and in particular toward the scan pels having the grey level information most closely related to black.

The method of placing reproduction dots arranged in a matrix from a scanned picture that scans each picture element of the picture to obtain scan values from white to grey level and all black of each picture element comprising the steps of: fetching the scan value of picture elements surrounding the picture element being reproduced, summing selected fetched scan values in several configurations; comparing the sums obtained to find the sum that has a designated value, selecting a matrix pattern for controlling the picture element reproduction according to the designated value sum obtained, and setting the reproduction of the picture element according to the digital scan value and matrix pattern selected.

It is, therefore, an object of the present invention to provide an enhanced method and apparatus for reproducing visual information.

Another object of the present invention is to provide a coarse-scan/fine-print system that utilizes a grey level information obtained from the coarsely scanned characters to obtain a high resolution print reproduction by utilizing the scan value information of the pels immediately surrounding the pel being reproduced.

Yet another object is to provide a high resolution print reproduction system that utilizes grey level values of coarsely scanned character information to drive individual print dots according to the grey scale information of each pel, and biases the printing dots for each pel by utilizing the scan value information of the pels surrounding the pel being printed.

These and other objects of the present invention will become apparent to those skilled in the art as the description proceeds.

BRIEF DESCRIPTION OF THE DRAWINGS

The various novel features of this invention along with the foregoing and other objects as well as the invention itself, both as to its organization and method of operation, may be more fully understood from the following description of illustrated embodiments when read in conjunction with the accompanying drawing wherein.

GENERAL DESCRIPTION OF PREFERRED EMBODIMENTS

Figure 1:
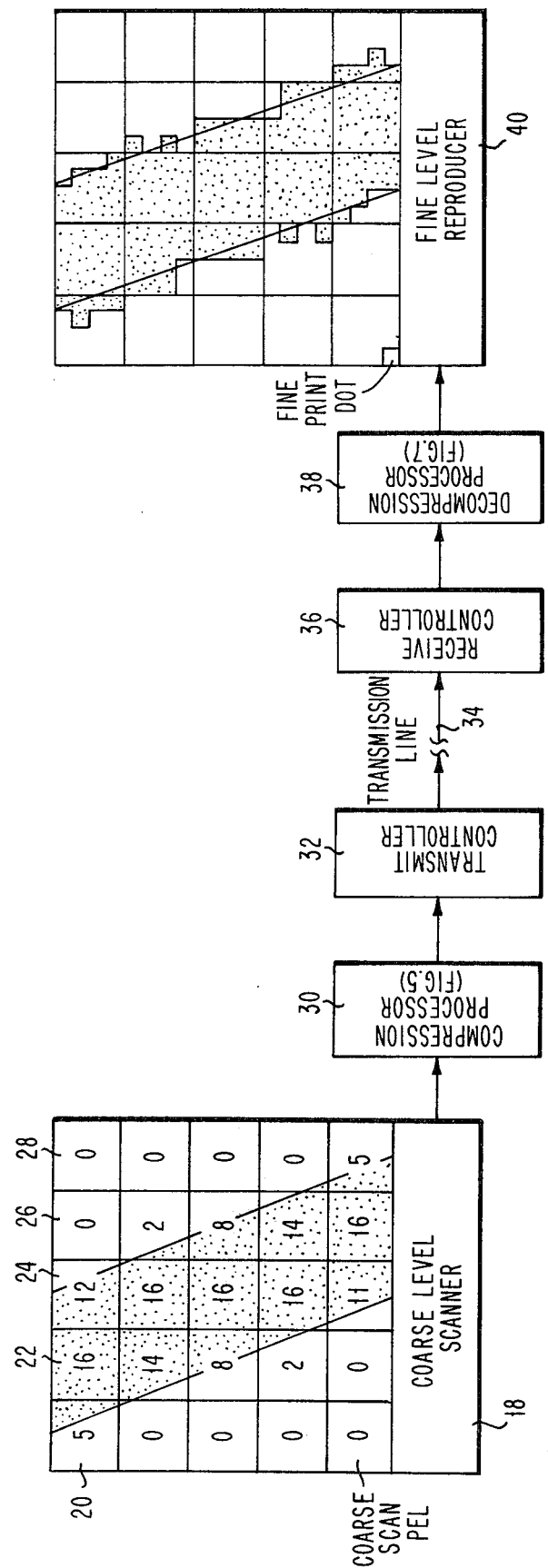
FIG. 1 is a block diagram of a coarse level scan device and a fine level reproduction device with a reproduction system for use with the present invention.
Figure 8:
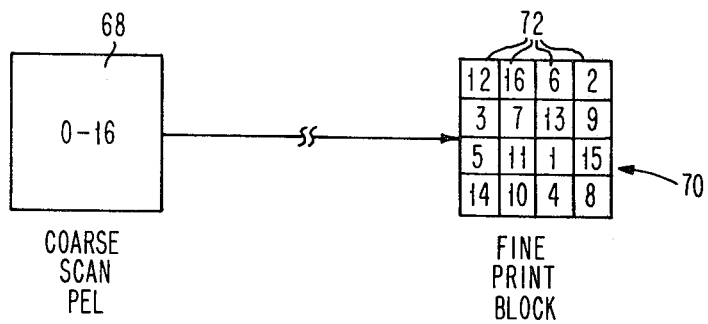
FIG. 8 shows a single scan pel for a coarse scan to a fine print block showing the print dot placement according to the prior art.
Figure 9:
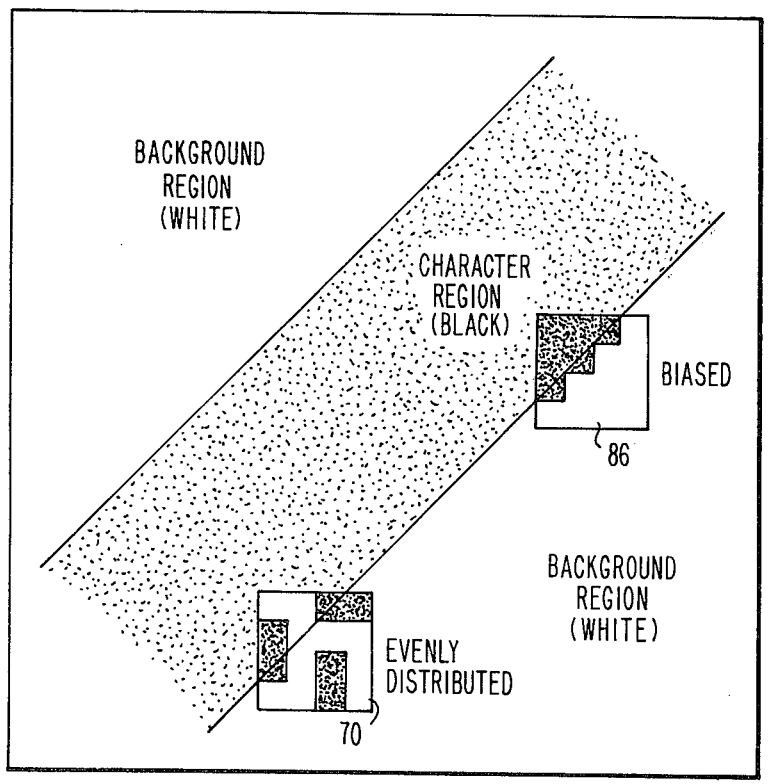
FIG. 9 illustrates the effect of an evenly distributed matrix print type to the biased matrix print type of the present invention.
Figure 10:
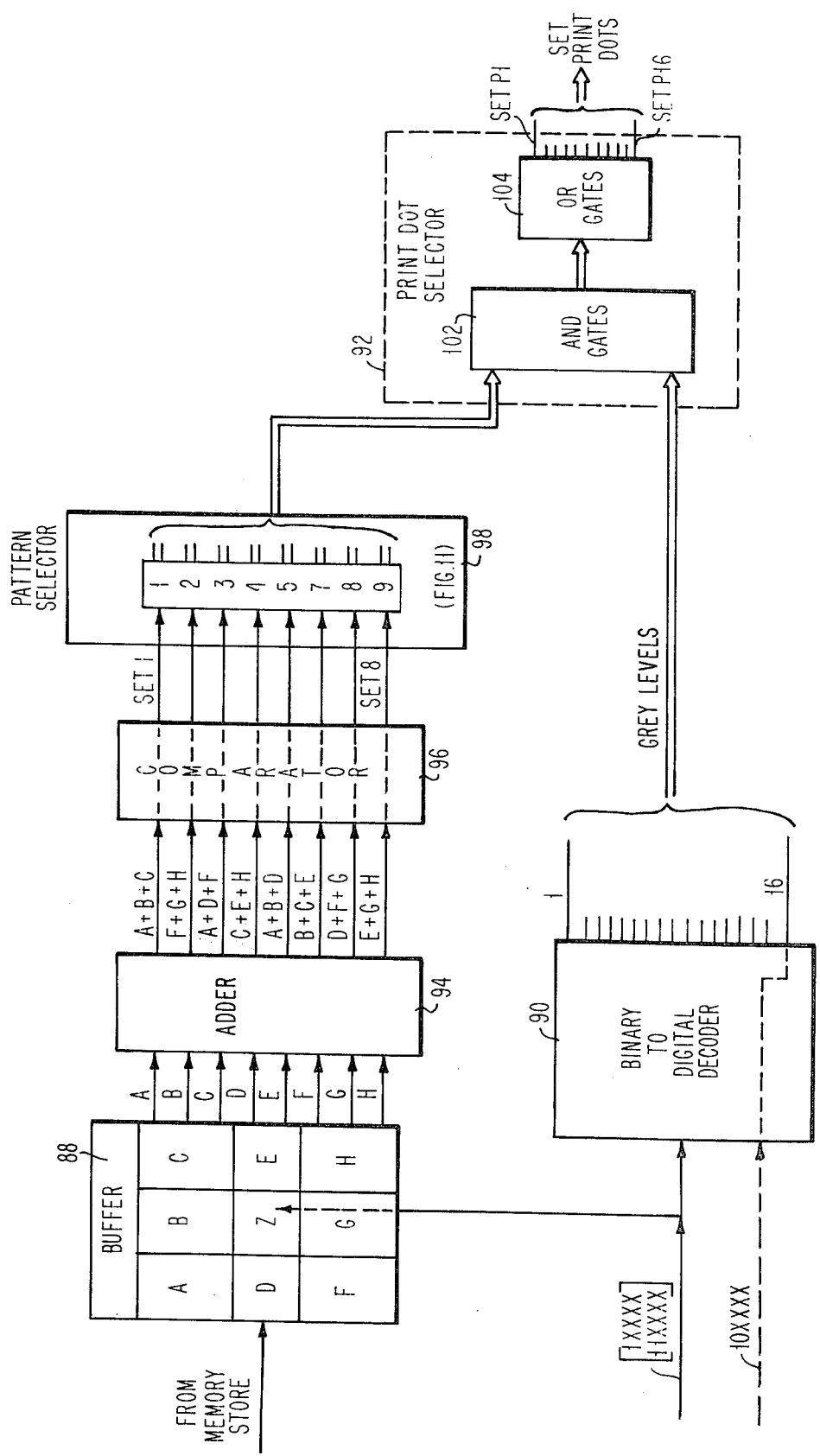
FIG. 10 is a block diagram of the apparatus of the single directional biasing scheme of a present invention showing an embodiment for the grey level decoder of FIG. 7.
Figure 11:
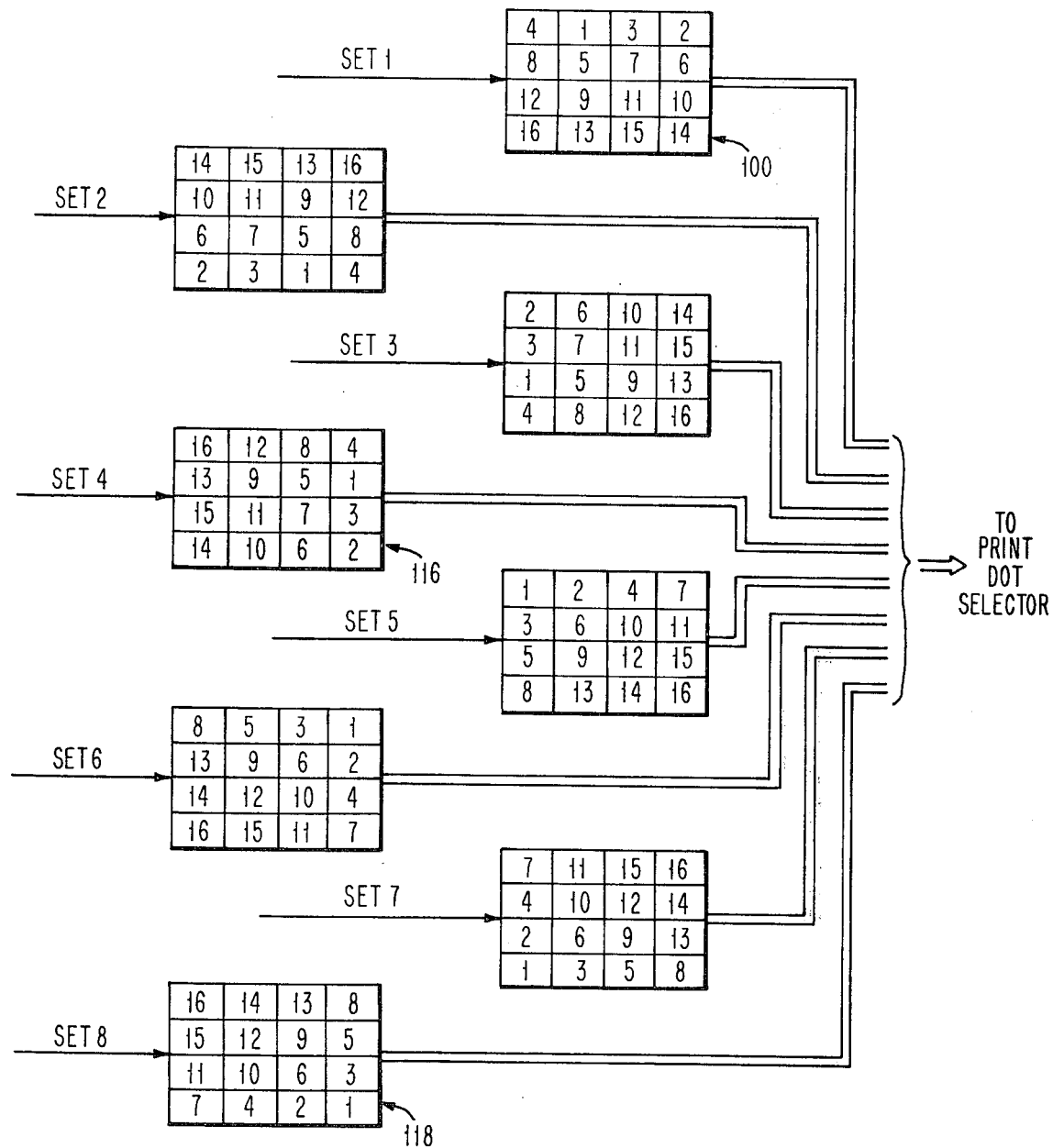
FIG. 11 illustrates the print dot biasing dot placement of the present invention using the preferred embodiment as a guide for the pattern selector of FIG. 10.

According to the present invention, the coarse level scan of a character information provides a scan value of from white to grey level and all black for each picture element scanned. This scan value information is directed to the reproduction system to control the fine level reproduction. In the present invention, the scan values of surrounding picture elements are reviewed to bias the fine printing dots toward the reproduced character rather than allowing the print dots corresponding to the grey level value to be arbitrarily positioned. The fine print character reproduction as shown in FIG. 1 is very close to that of the fine scan-fine print system disclosed in FIG. 3 for the prior art systems. The reproduction system of the preferred embodiment takes advantage of the lesser data transmission requirements of the coarse scan while improving the normal reproduction quality of the coarse print as disclosed in FIG. 2. The grey scale picture element as disclosed in FIG. 8 results in the preferred embodiment, in the 4 × 4 matrix print blocks of the fine print device. Using the single directional bias scheme of the present invention, as shown in FIG. 9, higher quality reprint can be obtained over that of the evenly distributed print dot. Using the square picture elements of the preferred embodiment as a guide, the picture element (pel) under review for reproductions as disclosed in FIG. 10 has its grey level fine print dots position altered by the scan value information of the eight surrounding scan blocks. In FIG. 10, the pel under review is identified as Z and its print dot information according to the grey level is altered by all of the eight surrounding scan pels A-H. The single directional biasing scheme results in the placement of the print dot according to a weighing structure as shown in FIG. 11. One of the these eight patterns are selected to reproduce the fine print grey scale information according to the number of print dots selected as representing the character in that scan block.

The present invention uses the directional biasing method to enhance the print quality of coarsely scanned characters. A larger scanning aperture can be used without sacrificing print resolution. The directional biasing method recovers some of the loss of information due to using a lower scan resolution. Thus, the advantages of the coarse scan, lower data transmission requirements, are retained while taking advantage of the fine print device, that is, high print resolution. In the preferred embodiment, the scan values range from 0–16, form white to grey level and all black, in a 4 × 4 matrix area.

In the preferred embodiment, the reproduction device is an on-off dot printing device. The scanner aperture size is larger than the printing dot size. This results in a reduction of the scanning resolution. The printing resolution remains at a high level as a result of the single directional biasing scheme of the present invention. Sixteen print dots are included in the preferred embodiment for each scan block. Thus, a dot print matrix of 4 × 4 can be controlled by a coarse scan device that produces a grey level scale of 16. In the preferred embodiment, the scan aperture size is 180 picture elements per inch and the printing dot size is 720 picture elements per inch. The 16 grey scale values of the coarsely scanned data bridges the picture element density requirements between what otherwise would be two incompatible systems; that is, the coarse scanning of 180 picture elements per inch to a fine print reproduction of 720 picture elements per inch. In the preferred embodiment, the background information is white while the character information is black on a grey level scale resulting in the activation of print dots. Thus, better character reproduction is obtained with the use of this single directional biasing scheme of the present invention. A threshold matrix is selected which is strongly biased toward the darkest surrounding patterns to produce a high quality of reproduction. The method of coarse scanning to obtain a fine print reproduction by single directional biasing of the grey level value of each picture element is further explained in the following description of the preferred embodiments showing the best mode of operation for the present invention.

DESCRIPTION OF A PREFERRED EMBODIMENT

Referring to FIG. 1, the character is coarsely scanned in a coarse level scanner 18 to produce white level or background information and grey level or character information in each scanned picture element or pel. In the preferred embodiment, the grey level scale comprises 16 possible grey level scales. In the first row of a coarse scan, the first pel 20 has 5/16 of the pel covered by the character. In the second pel 22 of the first row the character covers the entire block and thus is all black with a grey level of 16. The third pel 24 has a grey level scale of 12 out of a possible 16 and thus the grey level scale is 12. Fourth and fifth pels 26 and 28 of the coarse scan has only background information and thus the picture element is identified as a white level which could be stated to be a grey level of 0.

The coarse scan information from the coarse level scanner 18 according to the selected levels are directed to a compression processor 30. In the compression processor 30, the picture element is identified whether background or character information. Sequenced information is run length encoded and stored accordingly. The character or edge information is identified and is encoded according to the grey scale information, the 1–16 grey scale levels of the preferred embodiment. Each coarsely scanned picture element is separately encoded and stored. When ready, the scanned information is directed to a transmit controller 32 for placement on a transmission line 34, for instance.

The binary data information is received by a receive controller 36 and directed to a decompression processor 38. The decompression processor 38 decodes the received binary data information to separate the run length encoded information from the character or edge information and to decode the character or edge information according to the grey level scale. The background information and the character information, as represented by the grey level, controls a fine level reproducer system 40 according to a single directional biasing scheme to bias the grey level reproduction dots toward the side of the surrounding coarsely scanned block having the largest number of dots. The coarse level scanning together with the processing of the data information according to a data compression procedure and the grey level character encoding permits a high speed transmission of the binary encoded character. The fine level precision reproducer with the decompression process and the single directional biasing scheme permits a high quality character reproduction.

Figure 2:
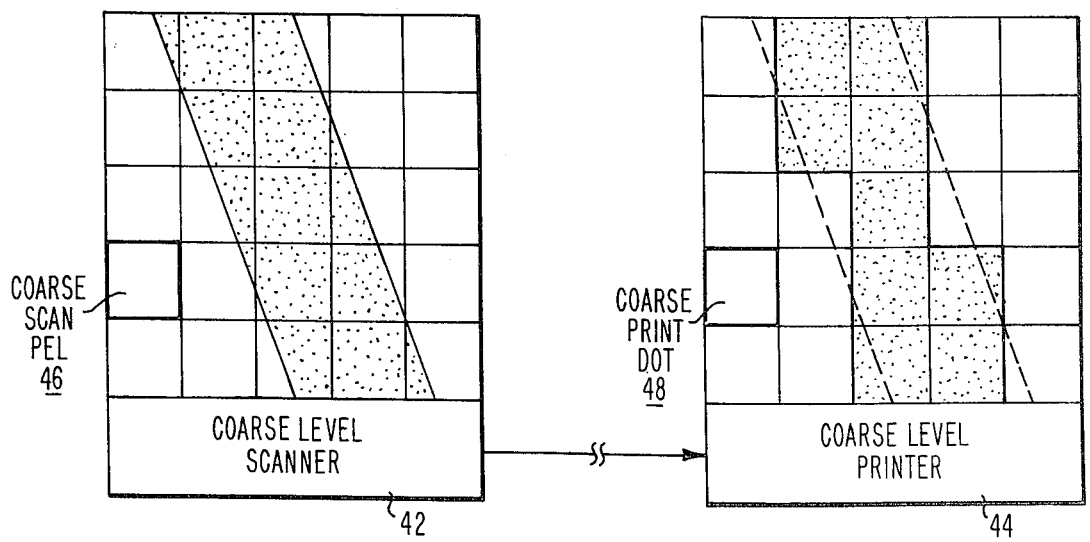
FIG. 2 illustrates the reproduction of the prior art coarse scan and coarse print reproducing system.
Figure 3:
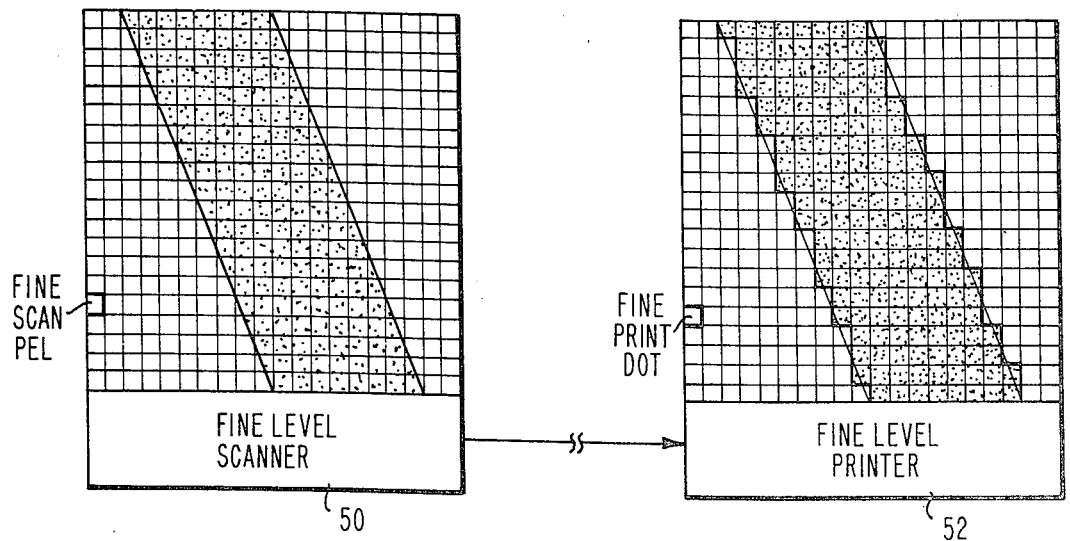
FIG. 3 illustrates a representation of the prior art for a fine scan and fine print reproduction system.

In order to show the advantage of a coarse scan and fine print together with the disclosed biasing scheme, reference is made to FIGS. 2 and 3 which disclose representations of the prior art systems. In FIG. 2 is shown a character reproduction system using a coarse level scanner 42 and a coarse level printer 44 of the prior art. A coarse scan pel 46 and a coarse print dot 48 as shown represents the area covered by a single scan position and a single print position, respectively. The coarse scan has the advantage that a lower amount of data is produced in a scanning operation and thus speed and ease of transmission is accomplished since a relatively small amount of information is obtained. Generally, the process of the prior art is such that a black or character element portion is printed if the character covers more than 50% of the area within the scanned picture element. The resulting character as shown in the coarse level printer 44 is only a rough representation of that originally scanned. The staircase portion of the character has proven to be objectionable to an observer. According to the prior art, for better print quality and resolution the fine scan and fine print process as shown in FIG. 3 was used.

A fine scan picture element of a fine level scanner 50 of FIG. 3 is substantially smaller than that shown in FIG. 2. Using the same processing scheme as for FIG. 2, that is, more than 50% of the character within a picture element produces a full print dot, the character shown in the fine level scanner 50 of FIG. 3 produces the character shown in a fine level printer 52. The staircasing effect of the fine level scan and print is hardly noticeable, since the eye of the observer tends to blend the rough edges. This character is not objectionable and, in fact, is preferred. However, the tradeoff is such that the fine scan requires that a large amount of digital information be transmitted, even though known compression processing schemes are used. The fine scan/fine print scheme of the prior art produces a pleasant character reproduction at the expense of a costly data transmission.

Figure 4A:
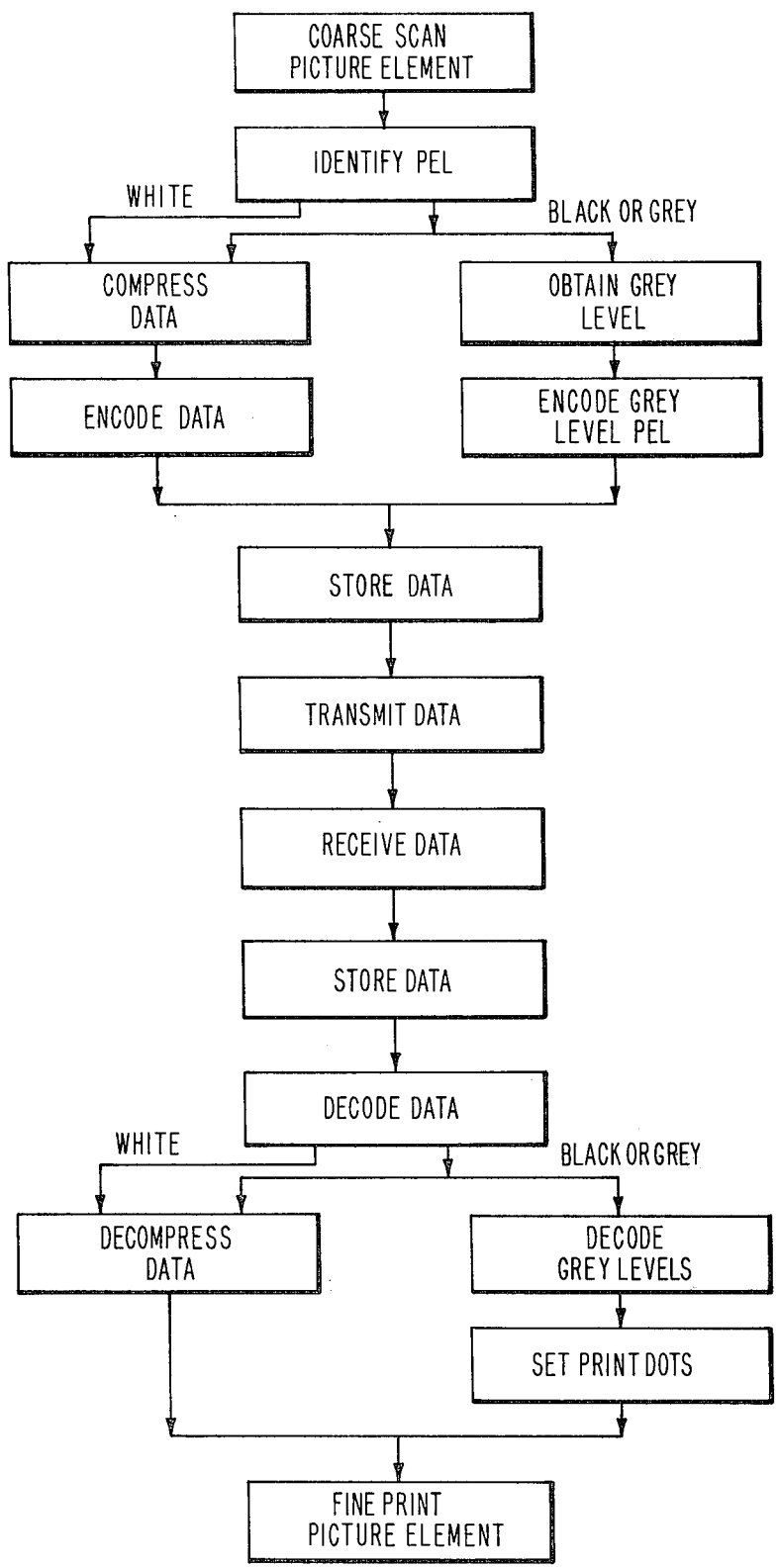
FIG. 4A illustrates method steps of a coarse scan to fine print reproduction system according to the embodiment of FIG. 1.

To lower the resolution requirement without sacrificing print quality, the advantages of the coarsely scanned character of FIG. 2 is combined with the advantages of the fine printing as shown in FIG. 3. The coarse scanning produces a less amount of digital information that must be transmitted while the fine print produces an acceptable character without an unpleasant staircasing effect of FIG. 2. To accomplish this apparent inconsistency between the coarse scan and fine print, the unique process identified in the flow diagram of FIG. 4A is used. Broadly stated, the character is coarsely scanned wherein coarse picture elements are identified according to white and grey levels. In one embodiment (FIG. 5A), only white information is encoded according to the well known run length encoding. Any picture element containing a portion of the character is encoded according to the percentage of the picture element covered by that portion of the character.

In a second embodiment (FIG. 5B) both white and all black levels are run length encoded and thus only the edge or partial black levels are grey scale encoded. In these embodiments, the fine print includes 16 print dots for each of the coarsely scanned picture elements with no dots representing all white. Thus, for each coarsely scanned picture element including at least a portion of the character, a grey level of from 0 to 15 is binarily encoded. The entire character representation according to the background and grey scale is stored for transmission. The received encoded information is decoded and decompressed according to the fine printing requirements. That is, the white information is decoded according to the run length encoding while the black character picture elements are decoded according to the grey level or all black binary encoding. The print dot matrix of the fine print is activated according to the information decoded from the grey level scale. As will be disclosed later, to better distribute the print dot, a special unique process is used, a single directional bias scheme, that uses the surrounding coarsely scanned background and character information to weigh the print dot toward the picture element that includes some portion of the character. The fine level reproduction as shown in FIG. 1 is the result of this scheme. Favorable comparison can be made with the fine level reproduction as shown in FIG. 1 with that resulting from the fine scan and fine print character as disclosed in FIG. 3.

Referring to FIG. 4A, the process starts by coarsely scanning a picture element (PEL). The picture element is next identified as to whether it is a portion of the background or of the character to be reproduced itself. If the picture element is identified as a portion of the character to be identified by its grey level, the next process step is obtaining the grey level according to the percentage of the picture element that is covered by the portion of the character. The identification of the picture element as a grey level of the character is binarily encoded and stored if desired.

If the pel identified is one that is not to be grey scale encoded, all white or all black for instance, this data is suitably compressed as shown in the process step block after the IDENTIFY PEL step where the step is to COMPRESS DATA. The next process is to suitably encode the compressed data and then to store the data, again if desired. The scanning procedure ends when the last picture element is coarsely scanned and the binary information is ready for transmission to the reproduction device as shown in FIG. 1. The data information is directed to the receive controller and on to the decompression processor where it is decoded and decompressed for reproduction according to the process continuing in FIG. 4A.

The transmitted data information is received in the next process step and directed to a storage device. The data information transmitted is decoded to identify the background information and the character information. This information together with the run length encoding information and the grey level data for the character information make up the byte which is the plurality of bits that together form a particular information group. In the process chart of FIG. 4A, the next operation is to identify the byte as to whether it identifies a background picture element or a character picture element.

If the byte is a run length encoded picture element, the process continues to decompress the run length encoding which in turn identifies the number of picture elements that are located in a sequence. The picture elements are reproduced effectively by activating the print process. The all black and all white pels are reproduced by treating the fine level reproducer as though it were a coarse level reproducer, that is, one white pel in the present embodiment will deactivate a 4 × 4 matrix in the fine level reproducer and one black pel will activate all of the print dots in a matrix.

If the byte decoded in the decode data step identifies a character picture element having grey levels, the process branches to decode the grey level information from the remaining bits of the byte. The dot printing is selected according to the grey level information retrieved. The process continues to bias the dots according to a single directional scheme according to a preferred embodiment such that the fine printing is enhanced by selectively loading the most dots towards the surrounding elements that contained prints of the character. The process steps for this print method is shown in FIG. 4B.

Figure 4B:
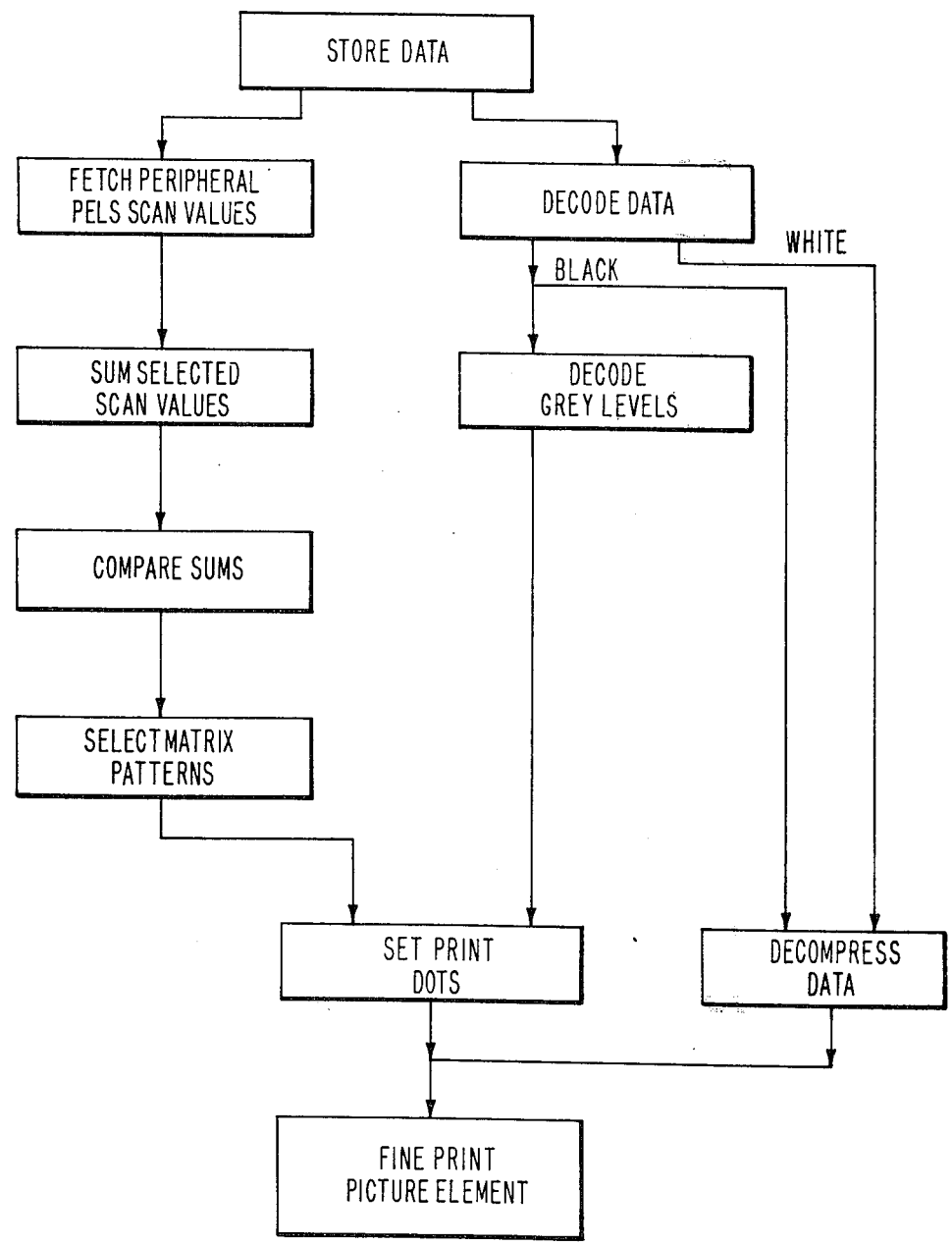
FIG. 4B depicts method steps for the dot placement in a printer according to the present invention.

In FIG. 4B, the process steps for a dot biasing scheme is shown. The print dots set as per the process steps of FIG. 4A are biased towards the character in an efficient manner. After the store data process step of FIG. 4A, the data information is decoded as stated to then decompress the compressed data and to separate the grey level values. The grey level values are decoded as per the process of FIG. 4A. According to the single directional biasing scheme though, the process steps further include another step of retrieving or fetching the scan values of pels peripheral to the pel being reproduced. The next step is to sum or add the scan values from the top and bottom horizontal, the right and left side vertical and the corner positions for groups of three of the peripheral pels, and then comparing these sums to find the highest sum. Then the next process step is to select a matrix pattern that biases the dot print according to preselected positions determined by the pattern that most closely resembles the print necessary for the highest sum position. The print dots are set accordingly in the next process step as before and the picture element is fine printed in the last process steps as also discussed in FIG. 4A.

It should be obvious that the coarse scanned picture element can also be directly connected to a fine reproduction device without using the advantages of the data compression technique disclosed. For instance, the grey levels and the white picture elements can drive the fine print device without encoding. The white picture elements can inactivate the matrix print and the grey level values can control the number of dots printed. The necessary process steps are to coarse scan the picture element, identify the picture element as to white or grey levels including all black, set the print dots according to grey level, and print according to the set print dots and the white picture element information. The print dots may be set according to the process disclosed in FIG. 4B to bias the dots according to that scheme. This process, of course, does not take advantage of the compression encoding scheme disclosed and its accompanying advantage to long distance transmission, that is, a fine reproduction capability with lower data transmission than previously known.

The objective of the present invention is to reduce the resolution requirements of scanning such that the number of bits to be transmitted can be reduced while keeping the printing resolution as accurate to the original character as possible. Lower scanning resolution means that a lesser number of scanner elements is required permitting the use of a lower power illumination light source due to the increase in the aperture area. The memory area for storing the character does not need to be as large with a lower scanning resolution. The advantages of the coarse scan/fine print together with the improved process for better identifying the position of the fine print picture element can be better described by referring to FIGS. 5-13.

Figure 5A:
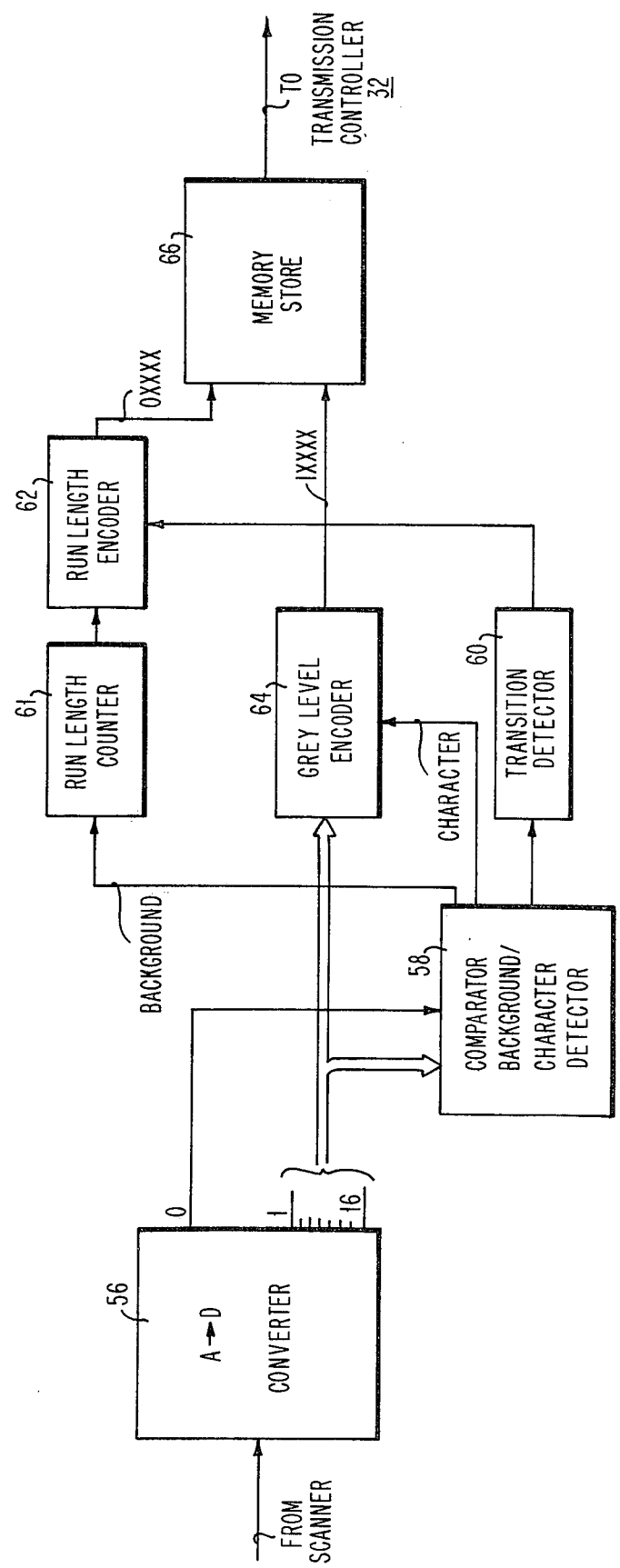
FIGS. 5A and 5B are block diagrams of different embodiments usable as the compression processor of FIG. 1.
Figure 5B:
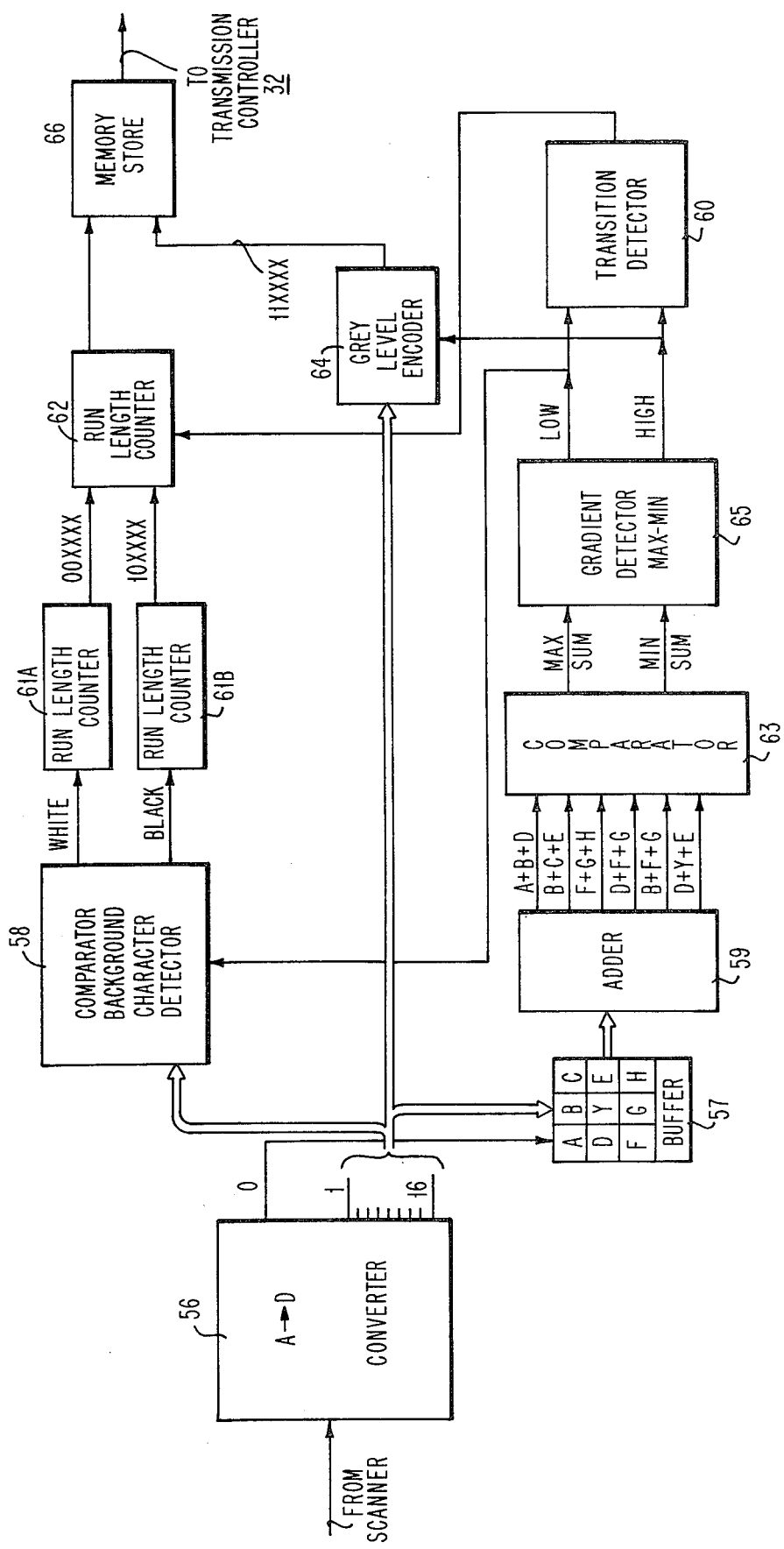
Figures 6A, 6B:
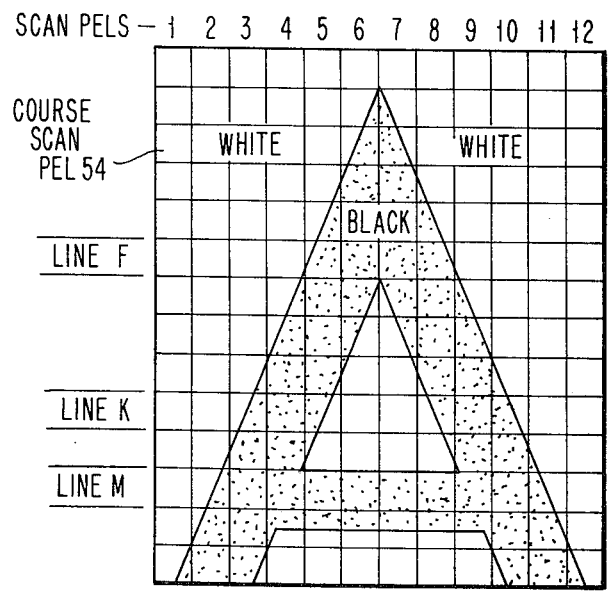
FIGS. 6A and 6B illustrate the compression scheme according to an embodiment of FIGS. 5A and 5B.

In the data compression scheme for scanning black and white documents, for instance, one embodiment disclosed uses run length code for the background (white) information and grey level values for the stroke of the characters (black) in the document. A byte thus contains the information identifying the background and also identifying the length of the run length code for the number of background picture elements in the code. A byte identified as containing character stroke information has further bits representing the grey level information of the picture element. The data compression scheme of this embodiment can best be described by referring to FIGS. 5A, 6A and 6B. In FIG. 6A, a character "A" is shown with each square representing a coarsely scanned pel 54. The fine print of the preferred embodiment and that which will be discussed is a printer which is capable of printing 16 dots in a square four dot by four dot matrix for each coarse scan pel 54. The required bits to activate the 16 print dots are obtained in the decompression processor 38 of FIG. 1. A more detailed block diagram of one type of decompression processor 38 is shown in FIG. 5A. A block diagram of a more efficient compression scheme with a second type of decompression processor 38 is shown in FIG. 5B.

Referring to FIG. 5A, when the character is being scanned, the amplitude analog signal is digitized in an analog to digital converter 56 into 16 grey values with 1 being the lowest grey value and 16 representing a completely black value. The header bit of each byte identifies whether the byte will be a background information and thus the next bits are run length information, or a character picture element and thus the remaining bits in the byte are grey value information. For the present embodiment an "0" in the header bit represents the background information and the next four bits of the byte are therefore run length information. A "1" as the header bit, identifies the byte as containing character bits information and the next four bits of the total byte contain the grey value information.

In FIG. 5A, the compression processor 30 comprises the Analog to Digital Converter 56, a comparator background/character detector 58, a transition detector 60, a run length counter 61, a run length encoder 62, a grey level encoder 64, and a memory store 66. The A-D Converter 56 accepts the analog signal from the scanner 18 and converts the signal into either an all white or background signal, or a grey level or character information signal. The background signal is directed to the run length counter 61 for counting the number of white pels until a character information is sensed. The detector 58 and the transition detector 60 senses the change from all white picture elements at which time the number of background picture elements are known and the background byte 0XXXX can be encoded in the run lengths encoder 62. The transition detector 60 can be a flip-flop circuit that senses the change from white to grey or vice versa. The "0" header bit signifies that this byte contains background information while the remaining bits define the binary number of background or white picture elements in a sequence. The character information is scaled on a 1–16 grey scale in the analog to digital converter 56 and directed to the grey level encoder 64. The grey level encoder 64 produces a byte of 1XXXX where the "1" header bit signifies that this byte contains character information. The remaining bits are binarily encoded to represent the digital grey scale. The grey level encoder 64 is activated by the sensing of a character by the comparator detector 58.

The binary encoded background and character information bits are stored generally in serial fashion in the memory store 66 for ease of serial transmission when the transmission controller 32 is activated, which in turn activates the retrieval of information from the memory store 66. For an example of the encoding and compression scheme of FIG. 5A, reference is made to FIG. 6A where the letter A is illustrated in black on a white background. Each square represents the coarse scan pel 54. Twelve scan pels are located in each scan line or row. Fifteen scan lines are used to cover a single character line. FIG. 6B is a chart showing the identification of lines F and K for the 12 scan pels. The "0" in the line identifies a white sensed pel and the "1" identifies a black sensed pel with the number in the parenthesis identifying the grey level on a 1-16 scale.

In FIG. 6A, at line F, scan pels 1, 4 and 10–12 all represent background or white picture elements. Scan pels 5–9 represent varied amounts of grey bit information. For the original background run length byte, the binary information bit will be represented as 00011 with the first 0 bit identifying the byte as containing background information and the binary encoded 3 identifying that 3 more picture elements are also representative of the background. The next byte could be encoded 11011 representing the fifth block of information. The "1" header bit identifies the byte as containing character information and the binary encoded eleven of the next four bits identifies the grey level of twelve as shown in FIG. 6B. For encoding, the grey level values of 1-16 are represented in binary encoding as 0-15 or 0000 to 1111. Scanning pels 6 and 7 of line F are all black, grey level of sixteen, and are, therefore, characterized by the encoding of 11111. Scan pel 8 of line F can be characterized as having a grey level of 12 and is characterized by the byte 11011. Scan pel 9 can be characterized by a character representation having a grey level of one since only one small corner is covered by the character and therefore this pel has the binary representation of its byte as 10000. The remaining pels 10-12 include white or background information and therefore will include a run length coding of 00010 to identify that the picture elements are background and the initial pel is followed by two white pels in the run length code. Thus, for line K in FIG. 6A as charted in FIG. 6B, the scanning blocks 1, 2, 6, 7, 11, and 12 include only background information and therefore the header bit will be encoded as a '0' followed by its run length coding. Scanning blocks 4 and 9 have a grey value of 16 representing all black and scanning blocks 3, 5, 8, and 10 have intermediate grey values from 0-16. Using the intermediate grey values as set out in the chart of FIG. 6B, for line K a block of data having 9 bytes is transmitted as follows: (00001), (10111), (11111), (10111), (00001), (10111), (11111), (11001), (00001). This message block along with the other line message blocks make up the binary information stored in the memory store 66 of FIG. 5A for later transmission out of the transmit controller 32 of FIG. 1 to the receive controller 36. When this compressed data is received, the decompression processor 38 reconstructs the character according to the fine print level reproduction in a resolution that is four by four times finer than the scan block with a coarse print. There are 12 × 15 scan pels in FIG. 6A. This is expanded to a 48 × 60 print pels or fine print dots.

The run length encoding scheme of FIG. 5A provides a compression of data information but it should be obvious that too much unnecessary grey level information is transmitted for all black, for instance. In line M, a run length of all black would greatly decrease the data transmitted. The only grey level values necessary for best reproduction are the character edge grey levels. Thus, a second embodiment is shown in FIG. 5B for a compression processor 30 of FIG. 1.

Referring to FIG. 5B, the compression processor 30 includes the analog to digital converter 56, a three line buffer 57, the comparator background/character detector 58, an adder 59, the transition detector 60, a run length counter 61A for white, a run length counter 61B for all black, the run length encoder 62, a comparator 63, the grey level encoder 64, a gradient detector 65, and the memory store 66. As with the embodiment of FIG. 5A, the scanned pel signals are directed to the analog to digital convertor 56 where the analog signals from the scanner are digitized with 0 representing white, 16 representing all black, and 1-15 representing grey level values. The output signals from the analog to digital converter 56 are directed to the comparator detector 58 where the characteristic of the picture element is determined. Since an otherwise all white or all black pel may erroneously contain a speck of black or white, the pel Y being encoded is first compared to the surrounding pels.

The digital information of surrounding pels A-H are placed into the three line buffer 57 along with the pel Y being encoded according to the pattern shown. The information from the buffer 57 is directed to the adder 59 where six sums are obtained as shown on the outputs from the adder 59 to the comparator 63. The comparator 63 obtains the maximum sum and the minimum sum from the sum outputs from adder 59. These signals are directed to the gradient detector 65 where the minimum sum is subtracted from the maximum sum. If the output from the gradient detector 65 is low, that is, below a set value signifying that surrounding pels have essentially the same value whether white or black, the comparator detector 58 is activated to count the pel in the appropriate run length counter. If the output from the gradient detector 65 is high, signifying a large contrast, the grey level encoder 64 is activated and the grey level values are suitably encoded. The transition detector 60 detects a change from white to black or vice versa to activate the run length encoder 62. The run length encoder 62 suitably encodes the data information for storage in the memory store 66 together with the directly stored grey level values from the grey level encoder 64. The output signals from the memory store 66 are directed to the transmission controller 32 of FIG. 1 as required.

For the embodiment of FIG. 5B, a run length byte of 00XXXX with header bits of 00 can signify an encoding of white pels, again with the binary numbers XXXX signifying the length of successive white pels. A run length byte of 10XXXX can signify a run length encoding of all black pels, again with the binary numbers XXXX signifying the length of successive black pels. The grey level values can then be encoded as 11XXXX with the header bits of 11 signifying a grey level and the remaining bits of the byte binarily encoding the grey level values. Thus, the line F of FIG. 6A would be encoded 000011 for the first four pels, 111011 for the scan pel 5, 100001 for the scan pel 6 and 7 which are all black, 111011 for the grey level value of scan pel 8, 110000 for the grey level value of scan pel 9, and 000010 for the run length encoding of all white pels 10, 11 and 12. The number of bits encoded are not significantly different from the embodiment of FIG. 5A but would be much less when line M is encoded. For the embodiment of FIG. 5A, all pels would be individually encoded since no white run lengths are encountered. For the embodiment of FIG. 5B, the pels 3 to 10 would be run length encoded as 100111 and not individually.

The present invention uses the analog output of the scanner divided into a finer grey scale value to accomplish the expansion of the data that is required to drive a higher resolution device. A coarse scan pel 68, see FIG. 8, provides a white signal output '0' as well as 16 grey levels. This is expanded by activating the 16 dots of a print matrix accordingly. In FIG. 8, a fine print block 70 contains print dots 72 shown in a random rating position where all dots at or below the grey level signal are activated. Thus, for a grey level of 6 out of a 1-16 rating, print dots 1 through 6 are activated. The resulting fine print block 70 is shown in FIG. 9 under the label of an evenly distributed dot placement scheme. A better scheme for placing the dots under a single directional biasing scheme will be disclosed later. The operation of the process steps of FIG. 4B and the receive process steps of FIG. 4A is described in the block diagrams of FIG. 7 showing the decompression processor 38 of FIG. 1.

Figure 7:
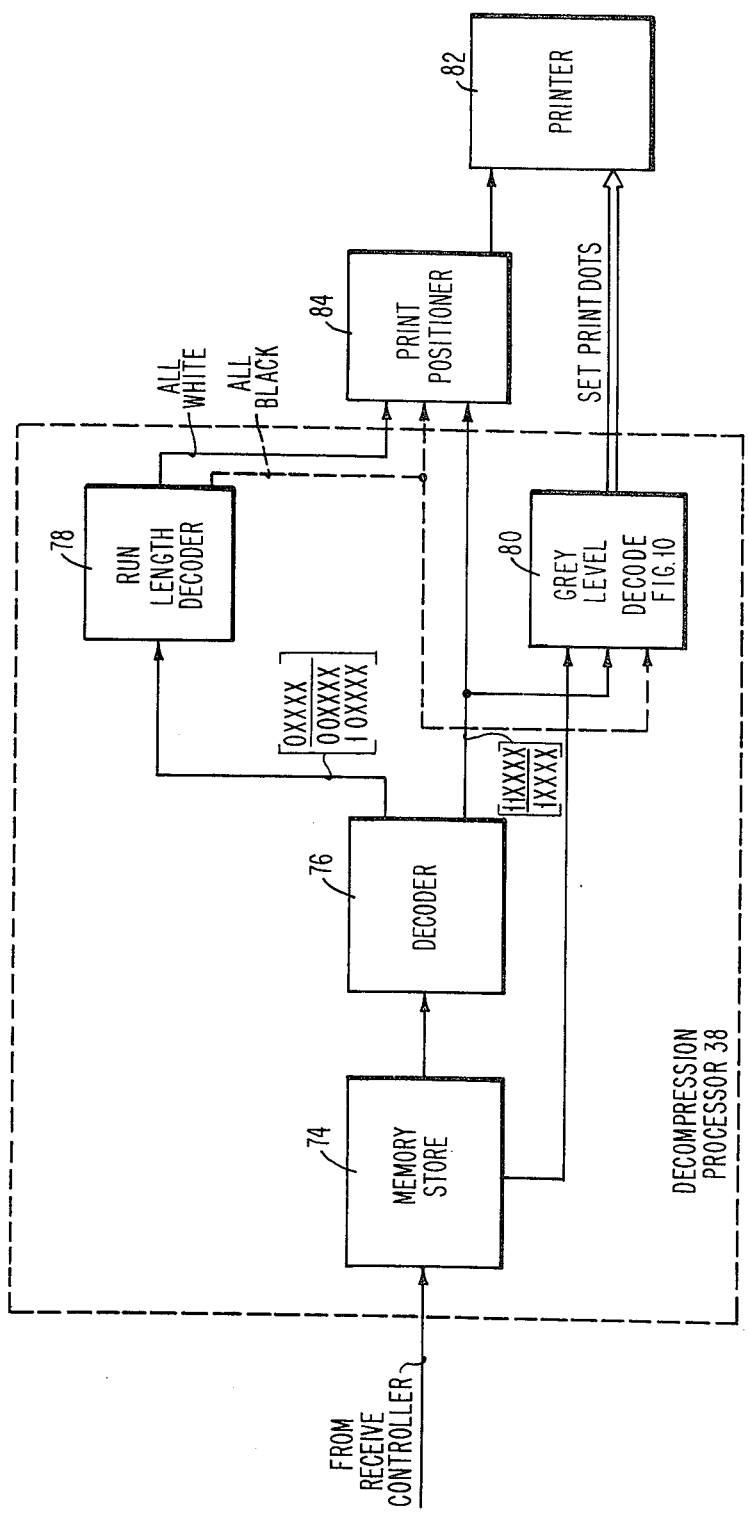
FIG. 7 is a block diagram of the decompression processor of FIG. 1.

Referring to FIG. 7, the data information signals received by the receive controller 36 are directed to a memory store 74 in the decompression processor 38. The stored information is decoded as to background and character information in a decoder 76. The run length signal information is directed to a run length decoder 78 while the grey level signal information is directed to a grey level decoder 80. The grey level decoder sends a set print dots signal to a printer 82, the fine level reproducer 40 of FIG. 1. The output signals from the run length decoder 78 and the grey level signal from the decoder 76 are directed to a print positioner 84 which controls the scanning and spacing operation of the printer 82. The run length grey level signals control the printing placement while the set print dots signals control the dots that are activated to print a part of the character in the printer 82.

The run length signals from the decoder 76 are labeled [0XXXX and 00XXXX, 11XXXX] to signify the output signals from both compression embodiments of FIGS. 5A and 5B. Likewise the grey level signals [1XXXX and 11XXX] are the signals from both embodiments of the decoder 76. The solid signal lines denote signal direction for the embodiment of FIG. 5A while the dotted lines for the all black signals are added for the embodiment of FIG. 5B.

It should be understood that the printer 82 of the present embodiment produces four print dots in each column of scan pels as well as four lines of print dots in each scan line. A scanning printer, akin to a CRT line scan, would require four scans to complete one line of scan pel information. The individual dots of each scan line can be turned on and off according to the even distribution scheme as shown in FIGS. 8 and 9 according to the grey level information received. Of course, on white scan pels, all fine print dots in that identified 4 × 4 matrix are not activated. In a character or line dot printing scheme, all print and no print dots are set into position accordingly either by a prescan or by a parallel data transfer from a buffer unit (not shown) to the printer 82. The particular printer scheme need not be more fully described here as many substitutions can be made within the skill of one knowledgeable in the art.

In FIG. 9 is shown the effect of different print matrix placement on the fine printing. Using the even distribution scheme for instance, the print block 70 receiving a grey character information on a scale of 6 will have the print dots randomly placed as shown. The random distribution is taken according to that shown in FIG. 8. However, if a biased scheme is used, such that the placement of the black dot can be distributed according to a scheme wherein the print dots are biased towards the character region, a placement of the print dots as shown in a biased print block 86 of FIG. 9 occurs. The differences in the resulting character print between the two is quite evident. The use of the bias scheme would give a much better reproduction of the original character.

For a scan element to be printed on the edge of a character stroke, it would be advantageous to activate print dots in the section that corresponds to the black region inside the stroke character. Using the evenly distributed placement scheme of FIG. 8, a number of dots will be placed in the background white region outside the character stroke. These print dots, protruding from the normal character stroke boundaries, produce a hazy print. Since characters normally have sharp boundaries, information from neighboring scan elements could be used to bias the printing dots toward the dark side of the surrounding coarse scanned elements. The print dot biasing method proposed can be considered as a non-linear interpolation scheme. A linear interpolation scheme is a widely used method in curve fitting and statistical analysis of data.

In order to use a print dot biasing scheme, an assumption has to be made about the character stroke width in relation to the scan aperture size. To detect the surrounding darkness or grey pattern, the eight surrounding scan picture elements of the scan pel Z under observation are examined, see FIG. 10, to bias the dots in the scan area to be printed. The actual number of dots printed is determined by the grey level value of the scan element being processed. The grey level values of various groups of three scan pels are added to form a sum. There are eight sums corresponding to eight possibilities of dot biasing. The eight sums correspond to eight patterns located symmetrically on both sides of four bisecting lines of the scan pel, namely vertical, horizontal, and two intersecting 45° lines. For each pattern sum, there is a threshold matrix associated with it that determines the dot placement when printing. A particular threshold matrix corresponding to the largest value of the pattern sum among the eight possible cases is selected to print the dots in the scan pel. It should be noted that the dots in each matrix are designed to be strongly biased toward the direction of the associated pattern. The effect of the single directional biasing scheme results in a print quality with excellent restructuring of the original character. The single directional biasing method can be easily implemented requiring several logic components and some memory store for the threshold matrices. FIG. 10 illustrates a block diagram for implementing the single directional biasing scheme of the invention.

Referring to FIG. 10, for the single directional biasing scheme, the grey level decoder 80 of FIG. 7 includes a three line buffer store 88 to hold the scan pel Z under examination and the surrounding scan pels A–H as shown. A binary to digital decoder 90 decodes the binary character byte 1XXXX or 11XXXX to a 1–16 grey level scale for the selection of the print dots by a print dot selector 92.

The grey level decoder 80 also includes an adder 94 for summing specific grey level information from the surrounding scan pels according to selected patterns, a comparator 96 for selecting the highest pattern sum of the specified scan pels, and a pattern selector 98 to alter the activation of the print dot selector 92 according to the highest pattern sum. The eight patterns of the preferred embodiment as produced by the pattern selector 92 are shown in FIG. 11 and will be described later.

The buffer 88 and adder 94 combine to select specific patterns biased in that the lower print dot numbers are prepositioned towards selected areas. Thus, the A+B+C output from the adder 94, if the highest sum as determined by the comparator 96, activates the SET 1 output and biases the print dots resulting from the scan pel Z to the top of the print block resulting from this scan pel. FIG. 11 shows the print dot placement in block 100 with the lower number print dots placed closer to the top vertical position. The lower number of the print dot means that that print dot will be activated by a lower grey level value. The general scheme for printing in the present embodiment is that all print dots at and below a grey level value are activated by the value. Thus, all 16 dots are activated by a grey level value equal to 16.

In FIG. 11, the print dot placement as shown can comprise a block of data stored in a read-only store memory. The patterns are permanently or semi-permanently placed in the elements of the read-only store and signals are retrieved according to the stored print dot placement when the read only store is activated by a SET signal from the comparator 96.

Figures 12, 13:
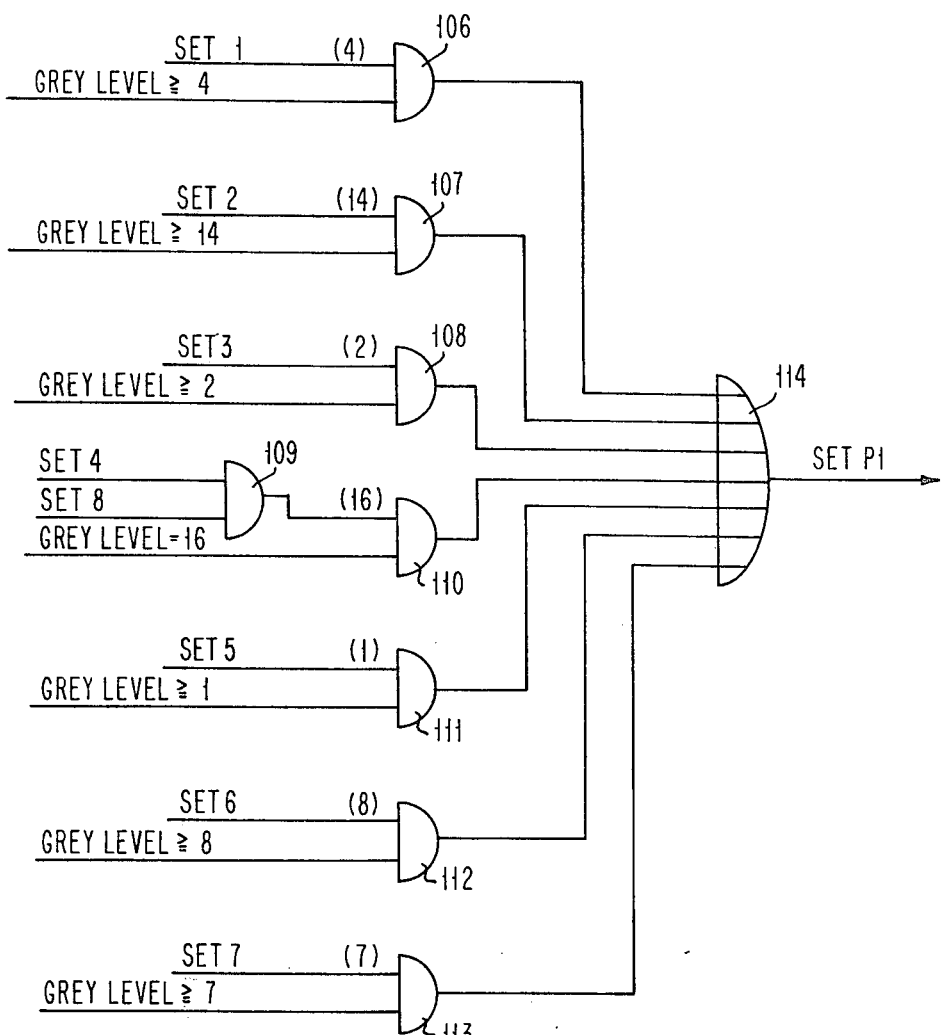
FIG. 12 shows a logic circuit usable to drive one print dot as part of the print dot selector of FIG. 10.
FIG. 13 illustrates a possible print dot placement scheme for use with the pattern selector of FIG. 11.

Correspondingly, it can be shown that each pattern selection according to the SET output signals from the comparator 96 determines the biasing of the print dots either vertically to either side, horizontally to either top or bottom, or towards any one of the four corners. The adder 94 in FIG. 10 combines the digital scan value information of each scan pel of the buffer 88 as shown in the output signals from the adder 94. The comparator 96 selects the highest pattern sum and activates one pattern block of the pattern selector 98 shown in FIG. 11. The pattern selector 98 activates the print dot selector 92 according to a set of AND-gates 102 and OR-gates 104. The print dot selector 92 activates the print dots P1–P16 according to the pattern selected and the grey level signals. A representative logical circuitry for accomplishing the activation of one print dot P1 is shown in FIG. 12. The separate print dots P1–P16 can be placed in accordance with FIG. 13.

Referring to FIG. 12, a series of logical gates 106 to 114 comprise the apparatus that could be used to activate print dot P1 of the entire print block of FIG. 13 which corresponds to one scan pel. Print dot P1 is the top-left most dot and therefore can print the grey level dots as shown in the similar position in the patterns shown in FIG. 11. For instance, if a SET 1 signal is received from the comparator 96, the AND-gate 106 is activated if the grey level signal from the binary to digital decoder 90 is equal to or greater than 4. The output of the AND-gate 106 activates the OR-gate 114 which in turn activates the SET P1 signal to activate the P1 print dot.

Likewise, the other SET 2–8 signals activate respective AND-gates according to grey levels. AND-gate 110, for instance, is activated only by a grey level of 16 either when a SET 4 or a SET 8 signal is activated as directed to the OR-gate 109 whose output controls one leg of the AND-gate 110. The patterns 116 and 118 in FIG. 11 show that with either an activated SET 4 or SET 8 signal, only a grey level scale of 16 will activate the top-left most print dot, print dot P1. The various other print dots can be similarly, logically activated by using the pattern selection of FIG. 11 and the representative logical devices and apparatus of FIGS. 10 and 12.

Single directional biasing, that is, selecting a fixed threshold matrix which is strongly biased toward the darkest surrounding pattern produces a print output comparable in quality to that of fine scanning and fine printing from a coarse scan and fine printing reproduction device. A high quality copy of original text can be configured using a large scan aperture of, for instance, 180 pel/inch and a fine dot printing device of, for instance, 720 pel/inch. The large scanning aperture would result in lessening the number of picture elements produced by a scanning operation and, therefore, provides a decrease in the light illumination power and the size of the storage buffer for the transmit and receive processing functions. Likewise the time required to transmit the lower number of bits of information is decreased since the number of scan elements are substantially decreased. Yet, the reproduction quality does not suffer substantially even with the coarse scanning methods being used.

The principles of the present invention have now been made clear in an illustrative embodiment. There will be immediately obvious to those skilled in the art, many modifications of structure, arrangement, proportions, the elements, materials and components used in the practice of the invention. For instance, the block diagrams of the preferred embodiments are representative of various assemblies such as large scale integration circuits, scanning and reproduction devices usable according to the methods proposed and advocated in the present invention. Different reproduction matrices can be envisioned. Lower resolution such as 2 × 2 or higher resolution such as 8 × 8 with using six binary bits of information for 64 grey level scales is possible. The appended claims are, therefore, intended to cover and embrace any such modification, within the limits only of the true spirit and scope of the invention.

What is claimed is:

1. In a method of printing a scanned image wherein scan values are obtained for each picture element of the image for reproduction at an improved print quality by activating a number of reproducing dots according to the scan value of each picture element, the improvement to the process of placing the reproducing dots activated comprising the steps of:
   obtaining the scan value for picture elements surrounding the picture element to be reproduced;
   calculating sums of the scan values for pattern groups of said obtained surrounding picture elements by summing the top and bottom horizontal, left and right side vertical, four corner patterns of each of three picture element scan values peripheral to the picture element being processed to obtain eight sums of three picture element scan values;
   comparing the calculated sums to find the largest sums; and
   biasing the activated print dots according to the largest sum found.

2. A process as defined in claim 1 wherein the step of comparing the sums to obtain the largest sum and the step of biasing the activated print dots selects a preselected matrix pattern indicative of the highest sum obtained to bias the reproduction dots toward the character.

3. The method of printing a scanned image at an improved print quality comprising the steps of:
   scanning each picture element of the image to obtain a scan value for each picture element;
   reproducing the image by the process steps of:
   (1) activating a number of reproducing dots according to the scan value of each picture element; and
   (2) placing the number of reproducing dots activated by the process steps of:
      (a) obtaining the scan value for picture elements surrounding the picture element to be reproduced;
      (b) calculating sums of the scan values for pattern groups of the obtained surrounding picture element by summing the top and bottom horizontal, left and right side vertical, four corner patterns of each of three picture element scan values peripheral to the picture element being processed to obtain eight sums of three picture element scan values;

(c) comparing the calculated sums to find the largest sum; and (d) biasing the activated print dots according to the largest sum found to select a preselected matrix pattern indicative of the highest sum obtained to bias the reproduction dots toward the character.

4. A method for reproducing a coarse scanned data image at an improved quality comprising the steps of:

providing a device capable of producing a plurality of dots within each scan area;

obtaining scan values for each surrounding scan elements;

calculating patterns sums of the scan values to sum the top and bottom horizontal, left and right side vertical, four corner patterns of each of three picture element scan values peripheral to the picture element being processed to obtain eight sums of three picture element scan values which correspond to eight threshold matrices;

producing a threshold matrix corresponding to each of the pattern sums;

selecting the largest pattern sum calculated; and activating the threshold matrix corresponding to said selected pattern sum whereby the reproduced pattern is biased toward the character.

5. A process for the reproduction of a scanned picture element of a picture comprising the steps of:

coarsely scanning a picture element of the picture;

identifying the coarsely scanned picture element according to a numerical level value from white to grey to black, where the numerical level of grey is equal to from 1 to N;

setting the reproducing dots in a fine reproducer where the coarsely scanned picture element is reproduced in an A × B size matrix of reproducing dots accordingly, where a white picture element activates no reproducing dots and a grey picture element activates the number of reproducing dots in the matrix according to its numerical value from 1 to N, where the product of A × B is equal to N and wherein the step of setting the reproducing dots is accomplished according to a single directional biasing scheme where the position of the reproducing dots are placed by the process steps of:

summing the level values of picture elements peripheral to the picture element being processed by adding the top and bottom horizontal, left and right side vertical, four corner patterns of each of three picture element level values peripheral to the picture element being processed to obtain eight sums of three picture element levels;

comparing the sums to obtain a biasing factor indicative of the position of the character;

selecting a pattern for placing the reproduction dots of the matrix according to this biasing factor; and setting the reproduction dots according to the selected matrix pattern.

6. A method of placing reproduction dots arranged in a matrix from a scanned picture that scans each picture element of a picture to obtain scan values comprising the steps of:

fetching the scan values of picture elements surrounding the picture element being reproduced;

summing the top and bottom horizontal, left and right side vertical, four corner patterns of each of three picture element scan values peripheral to the picture element being processed to obtain eight sums of three picture element scan values;

comparing the sums obtained to find the largest sum;

selecting a matrix pattern for controlling the picture element reproduction according to the largest sum obtained; and 7. A method as defined in claim 6 wherein the step of setting the reproduction of the picture element, sets a number of reproduction dots according to the scan value of the picture element being reproduced.

8. A method as defined in claim 7 wherein the step of selecting a matrix pattern, selects one of eight matrix patterns according to the largest sum and wherein the matrix pattern selected biases the reproduction dots towards a character of the picture.

* * * * *

UNITED STATES PATENT OFFICE
CERTIFICATE OF CORRECTION

Patent No. 4,124,870    Dated 11/7/78

Inventor(s) Bruce R. Schatz, Kwan Y. Wong

It is certified that error appears in the above-identified patent and that said Letters Patent are hereby corrected as shown below:

Claim 6
Column 18, line 32 insert after "and" --setting the reproduction of the picture element according to the scan value and matrix pattern selected.--

Signed and Sealed this

Twenty-fourth Day of April 1979

[SEAL]

Attest:

RUTH C. MASON
Attesting Officer

DONALD W. BANNER
Commissioner of Patents and Trademarks